(12) United States Patent
Polygerinos et al.

(10) Patent No.: US 11,209,114 B2
(45) Date of Patent: Dec. 28, 2021

(54) WATER PIPE INSPECTION ROBOT AND METHOD OF TRAVERSING A WATER PIPE

(71) Applicants: Panagiotis Polygerinos, Gilbert, AZ (US); Wade Adams, Gilbert, AZ (US); Carly Thalman, Mesa, AZ (US); Hassan Elsaad, Phoenix, AZ (US)

(72) Inventors: Panagiotis Polygerinos, Gilbert, AZ (US); Wade Adams, Gilbert, AZ (US); Carly Thalman, Mesa, AZ (US); Hassan Elsaad, Phoenix, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 357 days.

(21) Appl. No.: 16/389,632

(22) Filed: Apr. 19, 2019

(65) Prior Publication Data

US 2019/0323645 A1   Oct. 24, 2019

Related U.S. Application Data

(60) Provisional application No. 62/660,155, filed on Apr. 19, 2018.

(51) Int. Cl.
*F16L 55/34* (2006.01)
*F16L 101/12* (2006.01)
*F16L 101/30* (2006.01)

(52) U.S. Cl.
CPC ........... *F16L 55/34* (2013.01); *F16L 2101/12* (2013.01); *F16L 2101/30* (2013.01)

(58) Field of Classification Search
CPC .... F16L 55/34; F16L 2101/12; F16L 2101/30
See application file for complete search history.

(56) References Cited

U.S. PATENT DOCUMENTS

| | | | | |
|---|---|---|---|---|
| 3,224,734 A | * | 12/1965 | James | F16L 55/28 254/134.6 |
| 4,195,529 A | * | 4/1980 | Madoian | F16L 55/34 73/638 |
| 4,372,161 A | * | 2/1983 | de Buda | F16L 55/34 15/104.16 |
| 4,433,723 A | | 2/1984 | Parker | |

(Continued)

OTHER PUBLICATIONS

Calderon et al., "A Pneumatically-Driven Soft Robot Biologically Inspired by Earthworms" Apr. 2016.

(Continued)

*Primary Examiner* — Nathaniel T Woodward
(74) *Attorney, Agent, or Firm* — Michael Best & Friedrich LLP

(57) ABSTRACT

A device for traversing a conduit includes a body having a first member that is receivable within a second member. The first member is slidable relative to the second member. A first actuator is coupled to a first end of the body. A second actuator is coupled to a second end of the body. A third actuator is coupled to the body between the first actuator and the second actuator. The third actuator is also spaced apart from the first actuator and the second actuator. The device also includes a pneumatic system that is configured to change the pressure of the actuators.

20 Claims, 12 Drawing Sheets

(56) References Cited

U.S. PATENT DOCUMENTS

| | | | | |
|---|---|---|---|---|
| 4,848,168 | A * | 7/1989 | Negishi | F16L 55/28 |
| | | | | 73/865.8 |
| 5,317,607 | A * | 5/1994 | Formanek | F16L 55/26 |
| | | | | 376/260 |
| 5,662,587 | A * | 9/1997 | Grundfest | A61B 1/00082 |
| | | | | 600/114 |
| 5,758,731 | A * | 6/1998 | Zollinger | E21B 23/04 |
| | | | | 175/99 |
| 6,857,158 | B1 * | 2/2005 | Hunter | B08B 9/0553 |
| | | | | 134/167 C |
| 9,061,118 | B2 * | 6/2015 | Shoham | A61M 25/0116 |
| 10,774,975 | B2 * | 9/2020 | Bowie | F16L 55/44 |
| 2012/0292049 | A1 * | 11/2012 | Heijnen | E21B 23/14 |
| | | | | 166/381 |
| 2017/0322106 | A1 * | 11/2017 | Breaux | F16L 55/1283 |
| 2020/0094290 | A1 | 3/2020 | Polygerinos et al. | |

OTHER PUBLICATIONS

Elkmann et al., "Development of fully automatic inspection systems for large underground concrete pipes partially filled with wastewater", IEEE International Conference on Robotics and Automation, pp. 130-135, 2007.

Jung et al., "Artificial annelid robot driven by soft actuators" Bioinspiration & Biomimetics, 2(2):S42-S49, 2007.

Kim et al., "An earthworm-like micro robot using shape memory alloy actuator", Sensors and Actuators, A: Physical, 125(2):429-437, 2006.

Lee et al., "Novel mechanisms and simple locomotion strategies for an in-pipe robot that can inspect various pipe types", Mechanism and Machine Theory, vol. 56, pp. 52-68, 2012.

Omori et al., "Locomotion and turning patterns of a peristaltic crawling earthworm robot composed of flexible units", IEEE/RSJ International Conference on Intelligent Robots and Systems, pp. 1630-1635, 2008.

Ono et al., "A study of an earthworm type inspection robot movable in long pipes", International Journal of Advanced Robotic Systems, 7(1):85-90, 2010.

Polygerinos et al., "Soft Robotics: Review of Fluid-Driven Intrinsically Soft Devices; Manufacturing, Sensing, Control, and Applications in Human-Robot Interaction", Advanced Engineering Materials, pp. 1-22, 2017.

Rajani et al., "Non-destructive inspection techniques to determine structural distress indicators in water mains", Evaluation and Control of Water Loss in Urban Water Networks, pp. 21-25, 2004.

Rogers et al., "Sustainable utility infrastructure via multi-utility tunnels", 1st International Constrution Specialty Conference, May 2014, 1-10, 2006.

Liu et al., "State of the art review of inspection technologies for condition assessment of water pipes", Measurement Journal of the International Measurement Confederation, 46(1), pp. 1-15, 2013.

Takahashi et al., "The Development of an In-pipe Microrobot Applying the Motion of an Earthworm", Seimitsu Kogaku Kaishi/ Journal of the Japan Society for Precision Engineering, 61(1):90-94, 1995.

Verma et al., "A soft tube-climbing robot" Soft Robotics, 2017.

Wang et al., "Motion performance analysis of wheeled in-pipe robots based on ABAQUS", IEEE International Conference on Information and Automation, 2013, pp. 1092-1096.

Yamashita et al., "Self-localization and 3-D model construction of pipe by earthworm robot equipped with omni-directional rangefinder" IEEE International Conference on Robotics and Biomimetics, 2011, pp. 1017-1023, 2011.

Zhang et al., "In-pipe inspection robot with active pipe-diameter adaptability and automatic tractive force adjusting", Mechanism and Machine Theory, 42(12):1618-1631, 2007.

* cited by examiner

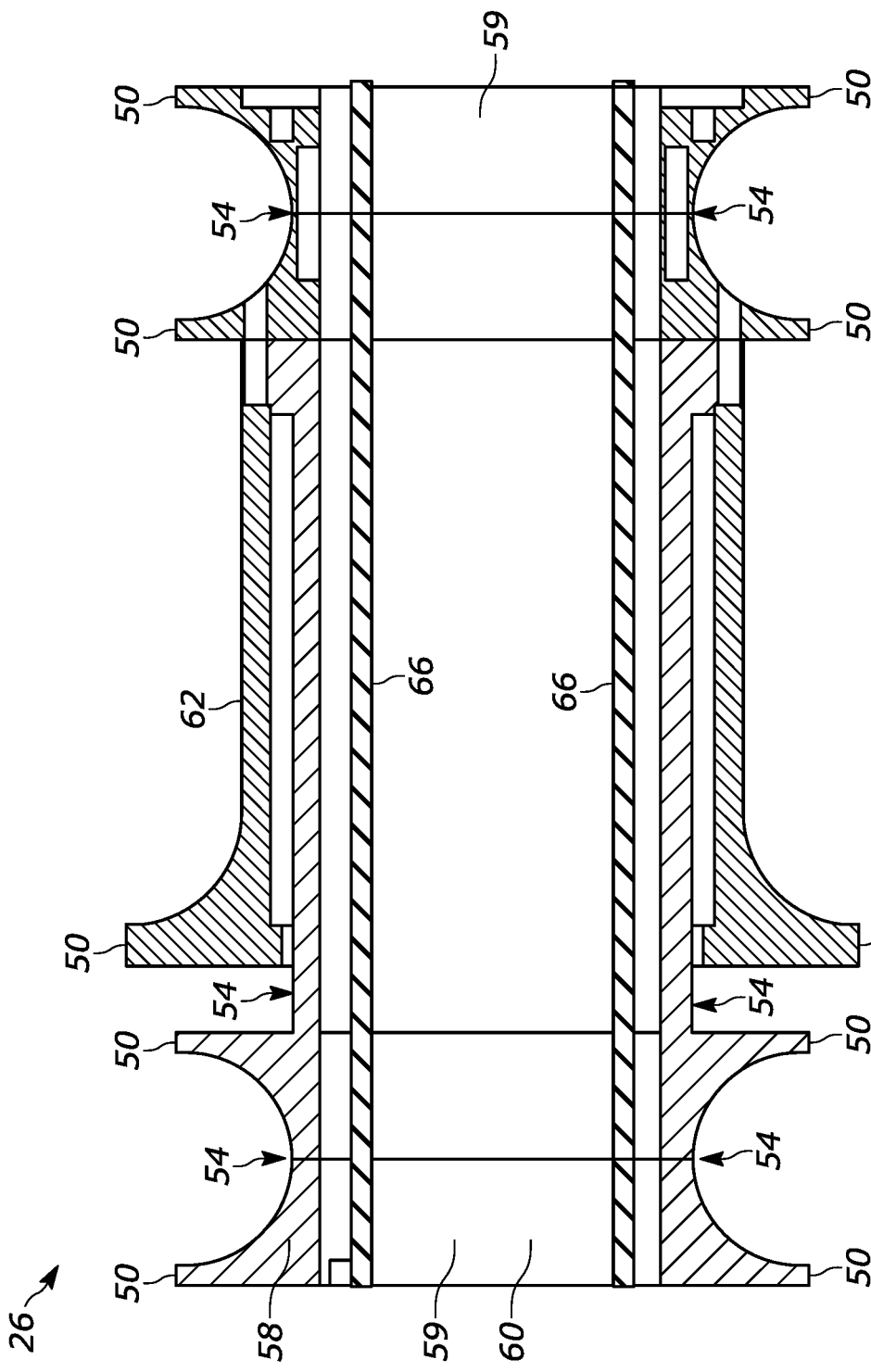

| STEPS | PROXIMAL | CENTER | DISTAL |
|---|---|---|---|
| STEP 1 | HOLD | INFLATE | HOLD |
| STEP 2 | INFLATE | HOLD | DEFLATE |
| STEP 3 | HOLD | DEFLATE | HOLD |
| STEP 4 | DEFLATE | HOLD | INFLATE |

FIG. 7

WATER PIPE INSPECTION ROBOT AND METHOD OF TRAVERSING A WATER PIPE

CROSS-REFERENCE TO RELATED APPLICATION

This application claims the benefit of U.S. Provisional Patent Application No. 62/660,155, filed Apr. 19, 2018, the entire contents of which are hereby incorporated by reference.

FIELD OF THE DISCLOSURE

The present disclosure relates to a water pipe inspection robot and, more specifically, to a robot movable with inflatable actuators.

BACKGROUND OF THE DISCLOSURE

Freshwater and sewage pipelines are fundamental to maintain the health, safety, and technological advancement of society. Therefore, maintenance and cleaning of these pipes must be performed for the pipes to continue to function. Current methods used to maintain and clean the pipes are generally inefficient. Some methods involve turning off the pipe supply and having humans crawl inside the pipes, potentially exposing them to health risks since the pipes may contain hazardous fluids and/or other materials. Other methods utilize a probe attached to a tether to provide ultrasonic sensing. The probes are prone to lateral movement, which leads to inaccurate data being collected.

Still other methods use pipe inspection robots, which can be expensive and may require frequent and invasive maintenance themselves in order to have continued functionality. These robots are typically made with rigid components that provide low flexibility to the robot. The buildup of debris in the pipe, often referred to as foreign object debris (FOD), contributes to the reduced applicability for water pipe inspection because it can cause severe damage to the locomotion mechanisms of the robot.

SUMMARY OF THE DISCLOSURE

In one embodiment, the disclosure provides a device for traversing a conduit includes a body having a first member that is receivable within a second member. The first member is slidable relative to the second member. A first actuator is coupled to a first end of the body. A second actuator is coupled to a second end of the body. A third actuator is coupled to the body between the first actuator and the second actuator. The third actuator is spaced apart from the first actuator and the second actuator. The device also includes a pneumatic system that is configured to adjust pressures within the first, second, and third actuators.

In another embodiment, the disclosure provides a device for traversing a conduit includes a body has a first member that is receivable within a second member. The first member is slidable relative to the second member. A tensioning band is coupled to both the first and second members. First and second inflatable actuators are coupled to an exterior of the second member. A third inflatable actuator is coupled to an exterior of the second member.

In yet another embodiment, the disclosure provides a method is provided for moving a device through a conduit. The device includes a body having a first member that is slidably received in a second member, a first inflatable actuator coupled to the body, a second inflatable actuator coupled to the body, and a third inflatable actuator coupled to the body. The method includes a first step of inflating the second and third actuators and deflating the first actuator, a second step of deflating the third actuator and inflating the first actuator while the second actuator remains inflated, a third step of deflating the second actuator while the first actuator remains inflated and the third actuator remains deflated, and a fourth step of inflating the third actuator and deflating the first actuator while the second actuator remains deflated.

Other aspects of the disclosure will become apparent by consideration of the detailed description and accompanying drawings.

BRIEF DESCRIPTION OF THE DRAWINGS

FIG. 5a is a section view of a substructure of the robot of FIG. 1, illustrating a retracted position.

FIG. 7 is a table illustrating states of a locomotion cycle of the robot of FIG. 1.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

In general, the present disclosure relates to a soft robot used in pipeline inspections and/or cleaning. The robot utilizes inflatable actuators which allow the robot to traverse pipes that have different diameters.

Figure 1:
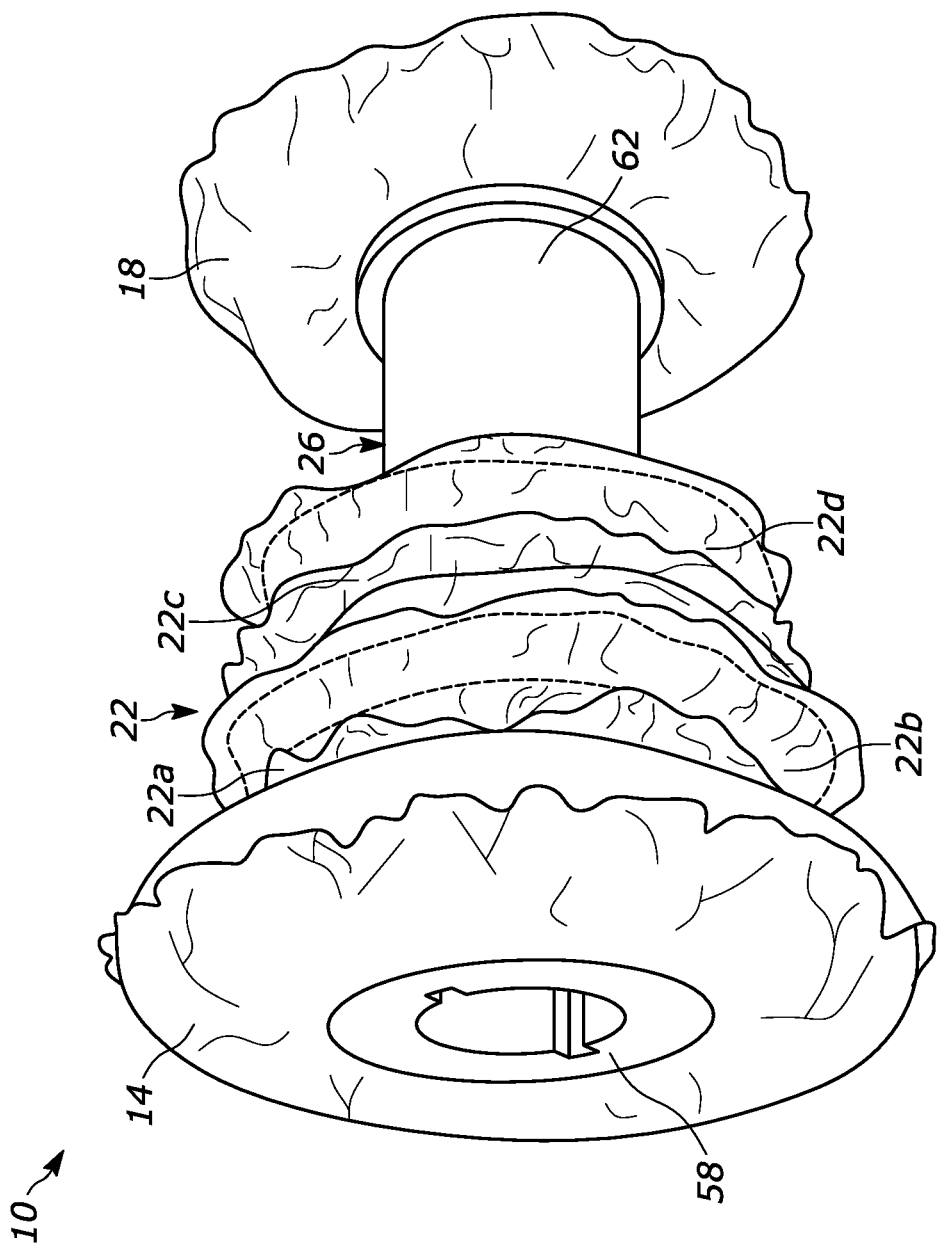
FIG. 1 is a perspective view of a robot according to one embodiment.

As shown in FIG. 1, a device or robot 10 includes a first or front actuator 14, a second or rear actuator 18, and a third or middle actuator 22. In the illustrated embodiment, the actuators 14, 18, 22 have a substantially toroidal shape. An inner diameter 38 (FIG. 3) of each actuator 14, 18, 22 is coupled to an outer surface of a body or substructure 26.

Figure 2:
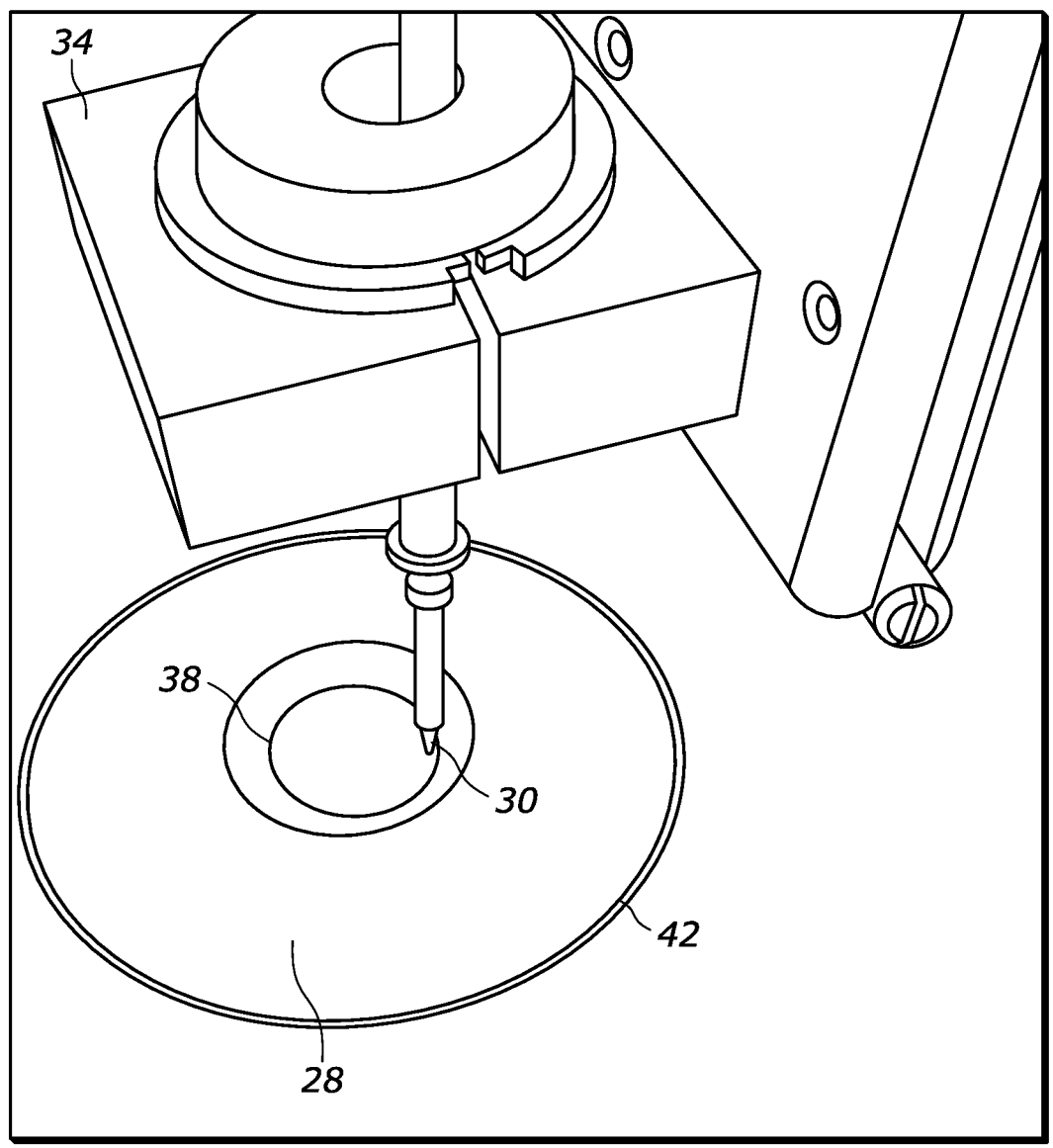
FIG. 2 is a perspective view of a Cartesian Computer Numerical Control (CNC) platform.
Figure 3:
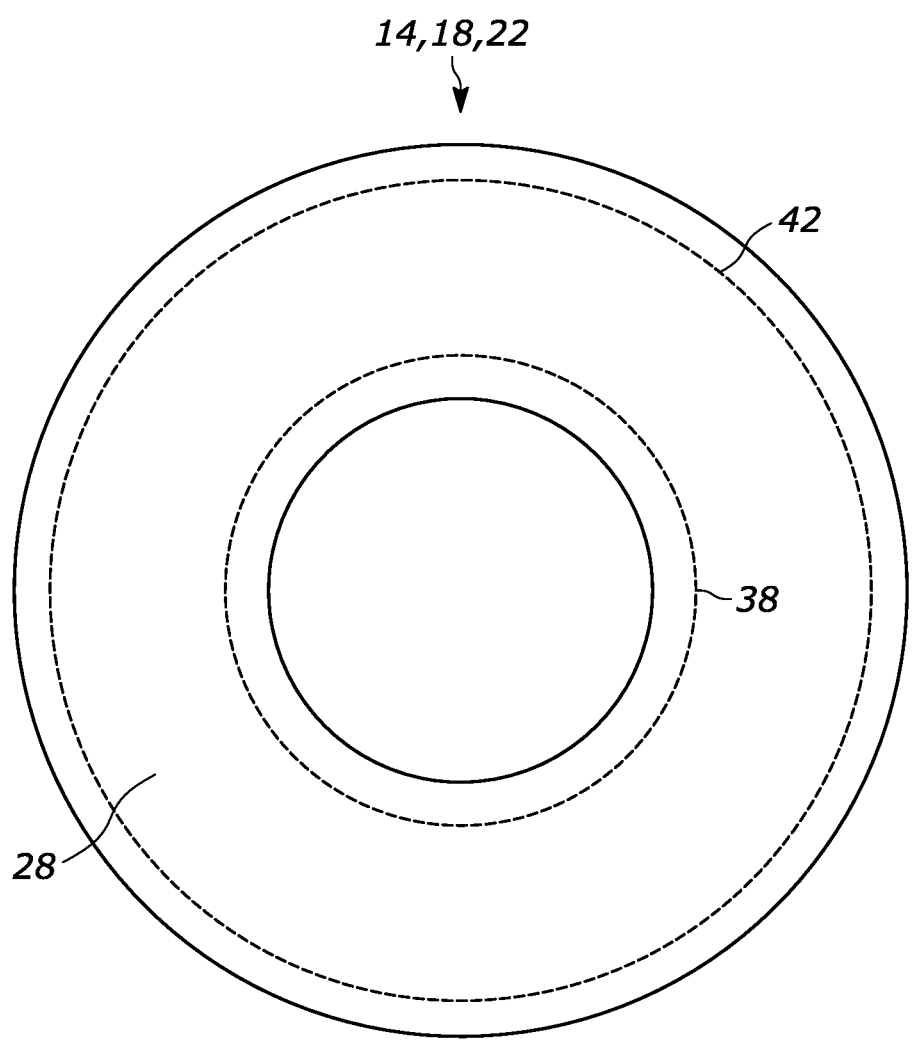
FIG. 3 is a perspective view of a body of the robot of FIG. 1, formed by the CNC platform of FIG. 2.

As shown in FIGS. 2 and 3, the actuators 14, 18, 22 may be fabricated by heat sealing individual layers of 40D (Denier) rip-stop Nylon fabric 28, or other suitable material, with a Thermoplastic Polyurethane (TPU) or other material backing. In the illustrated embodiment, two layers of the TPU lined nylon fabric 28 are stacked together with the TPU sides facing each other. A heated tip 30 is traced across outer and inner diameters using a Cartesian Computer Numerical Control (CNC) platform 34 in order to create consistent circular patterns. The CNC platform 34 simultaneously provides tracing accuracy, a consistent contact force, and heat. The CNC platform 34 also provides heat and pressure to seal the TPU along the inner and outer diameters 38, 42 (FIG. 3) of the actuators 14, 18, 22.

With continued reference to FIGS. 2 and 3, in some embodiments an airtight seal is formed when heat and pressure for the CNC 34 is applied to the layers of the fabric 28. A fully-sealed soft inflatable actuator 14, 18, 22 with a toroidal shape is formed after the pieces of fabric 28 are successfully bonded. Other embodiments include various other materials for the actuators 14, 18, 22, as well as other methods of forming the actuators 14, 18, 22.

Figure 4A:
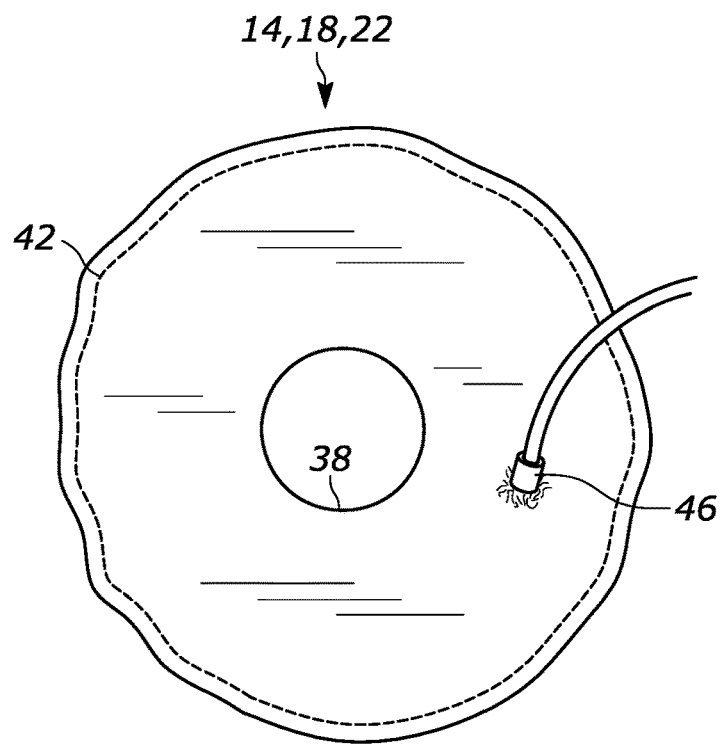
FIG. 4a is a front view of an inflatable actuator of the robot of FIG. 1, in a deflated position.
Figure 4B:
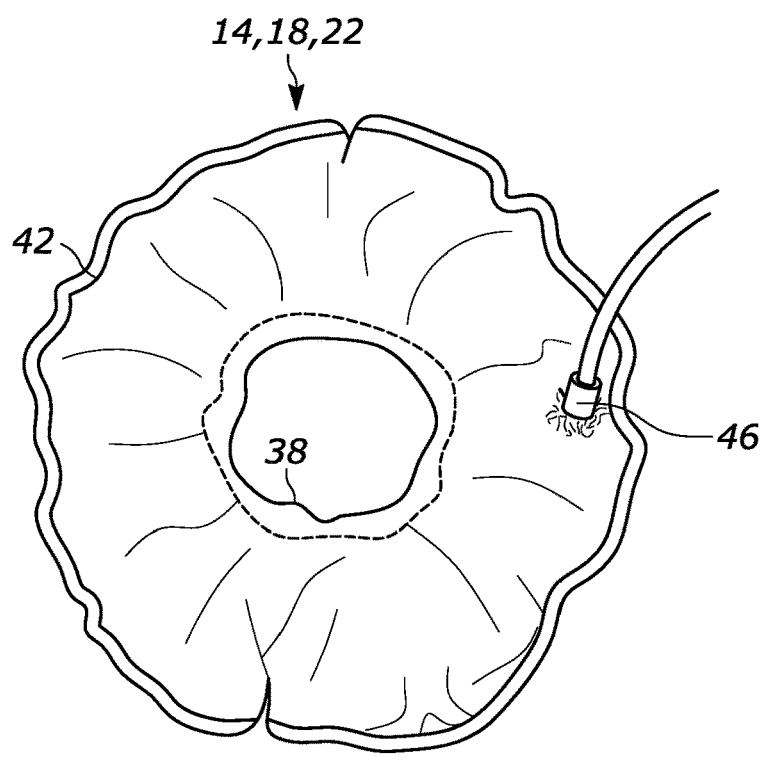
FIG. 4b is a front view of the inflatable actuator of FIG. 4a in an inflated position.

In the illustrated embodiment, a small hole (not shown) is cut into one of the layers of the fabric 28 to provide pneumatic supply to the inflatable actuator 14, 18, 22. The hole accommodates a vented screw 46 (FIG. 4a-4b), which allows air flow (or other gas or liquid) in and out of the actuator 14, 18, 22. The vented screw 46 may be made from stainless steel. The vented screw 46 may be coupled to a pneumatic system (not shown), which provides the air flow to the actuators 14, 18, 22.

As shown in FIGS. 5a-5d, the substructure 26 is an elongated member that may be generally cylindrical in shape. In the illustrated embodiment, the substructure 26 is rigid. The rigid substructure 26 is sized and shaped to house or otherwise support anchoring actuators (e.g., the front and rear actuators 14, 18), as well as linear displacement actuators (e.g., the middle actuators 22).

In the illustrated embodiment, the substructure 26 is spool-shaped and includes flanges 50 and grooves or recesses 54 disposed between adjacent flanges 50. The recesses 54 have a generally semi-circular profile and include a radius that is approximately equivalent to the inner radius of the actuators 14, 18, 22.

Figure 5B:
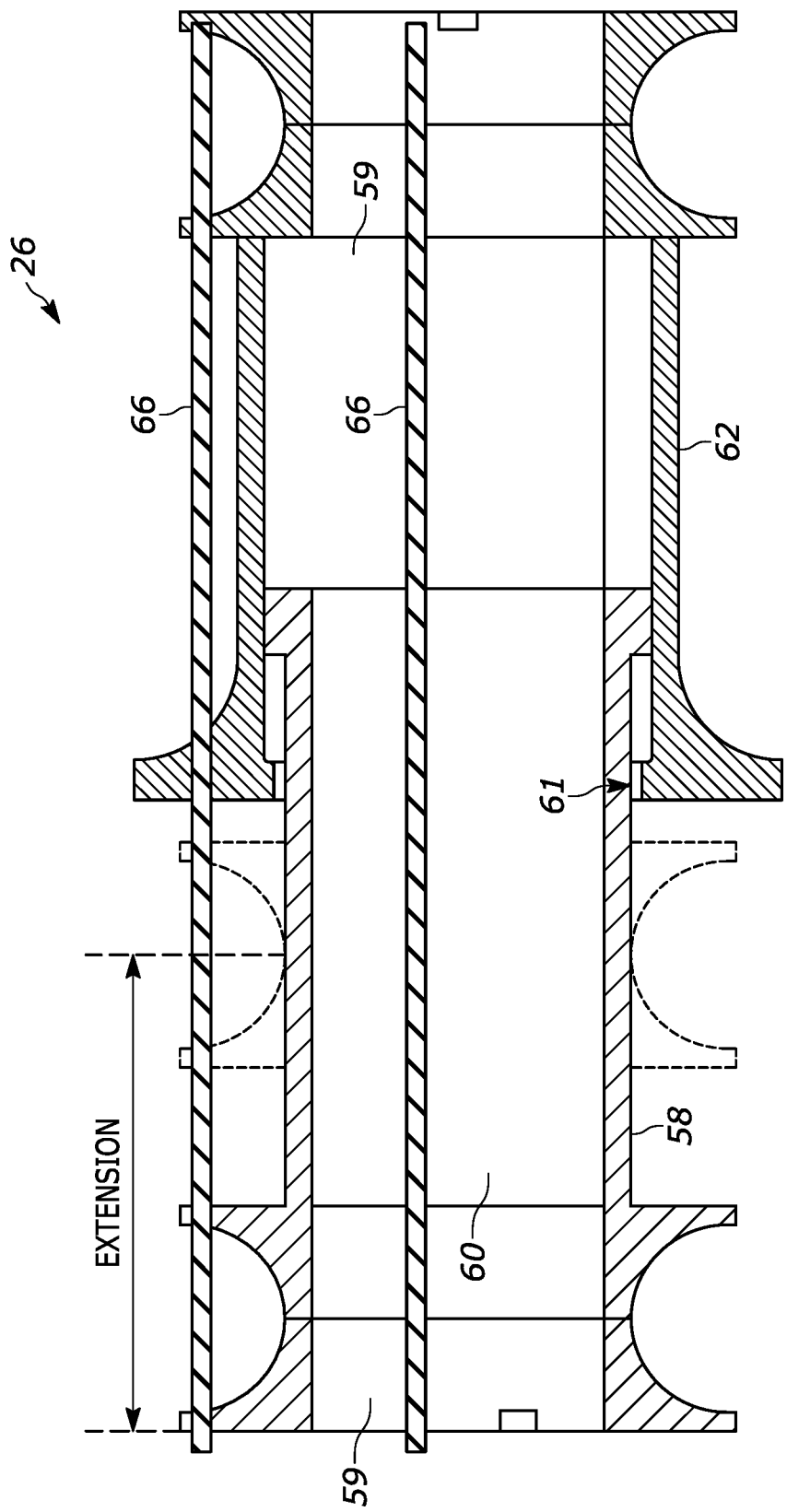
FIG. 5b is a section view of the substructure of FIG. 5a, illustrating an extended position.
Figure 5C:
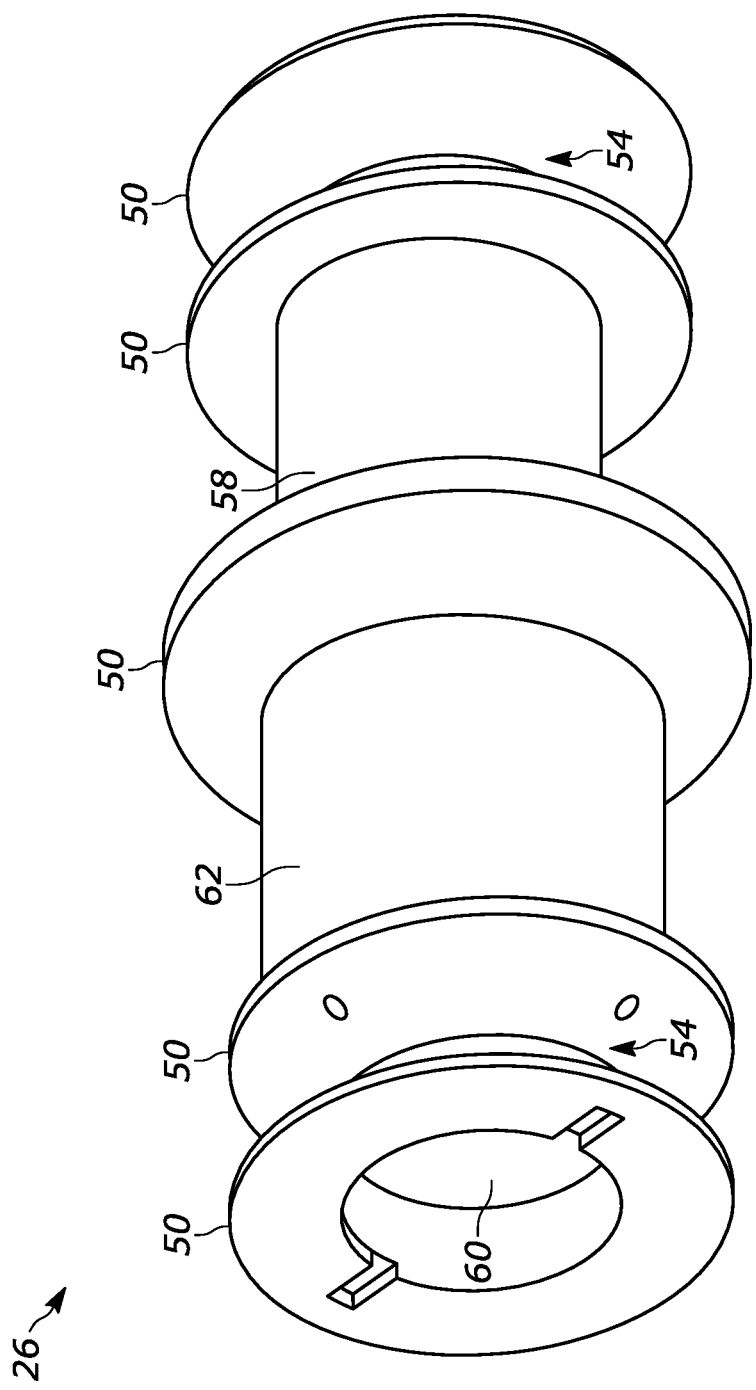
FIG. 5c is a perspective view of the substructure of FIG. 5b.
Figure 5D:
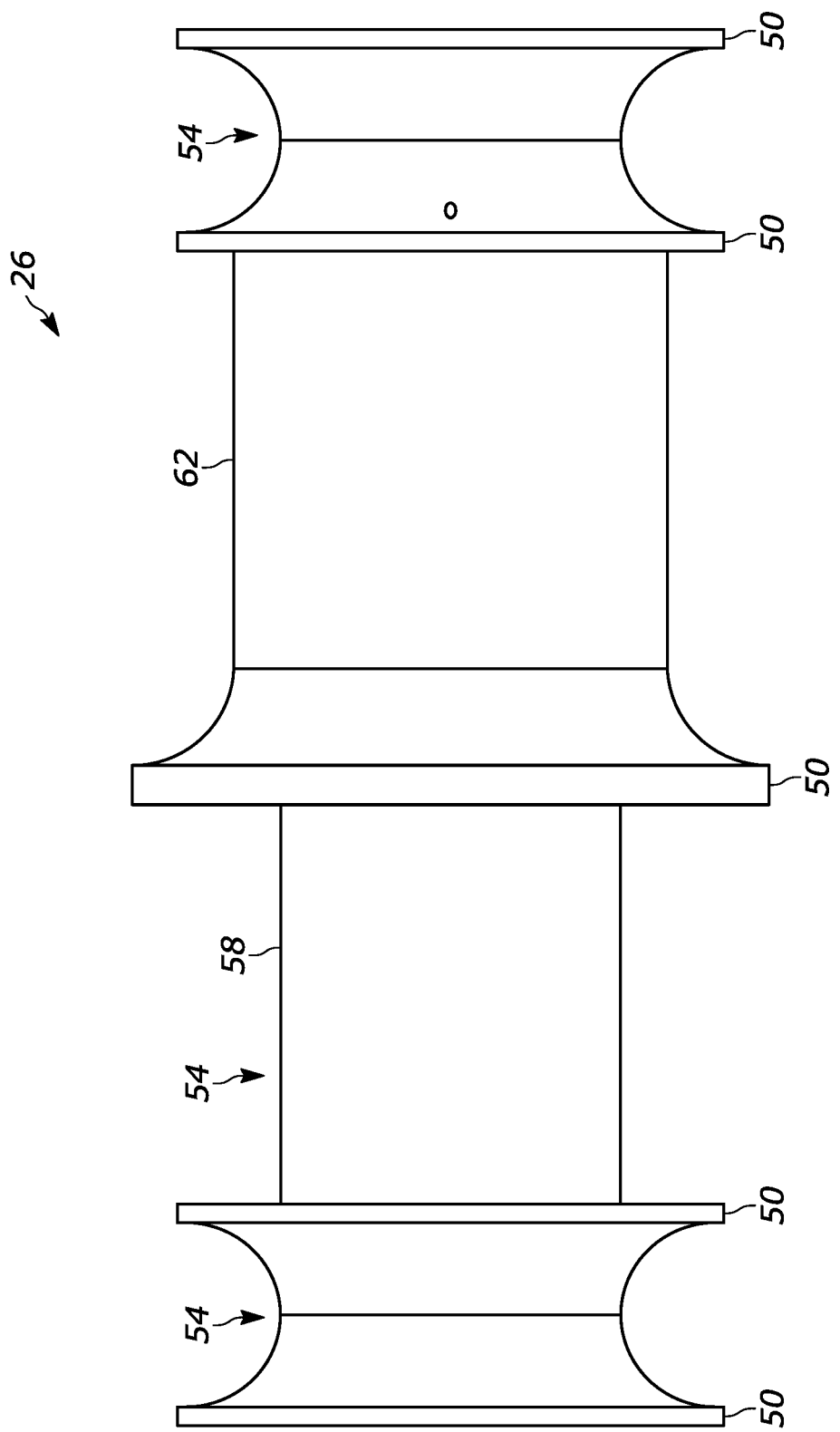
FIG. 5d is a side view of the substructure of FIG. 5c.

The substructure 26 also includes a first member 58 and a second member 62. In the illustrated embodiment, both the first member 58 and the second member 62 have hollow central portions 59 extending along lengths of the first and second members 62. The first member 58 is thus slidable through an opening 61 and within the hollow portion 59 of the second member 62. Together, the hollow portions form an internal passageway 60. Tensioning bands 66 are coupled to the first and second members 58, 62. In the illustrated embodiment, the tensioning bands 66 extend along the passageway 60 between a first end and a second end of the substructure 26. The first member 58 is slidable out of the second member 62 in a telescopic manner from a retracted position (FIG. 5a) to an extended position (FIGS. 5b-5d).

Returning to FIG. 1, the front actuator 14 is coupled to one of the recesses 54 proximate the first end of the substructure 26 (i.e., to an end of the first member 58), and the rear actuator 18 is coupled to one of the recesses 54 proximate the second end of the substructure (i.e., to an end of the second member 62). The middle actuator 22 is coupled to an end of the first member 58 distal the front actuator 14. The outer diameter 42 (see e.g., FIG. 3) of the middle actuator 22 is larger than the hollow portion 59 of the second member 62, so the middle actuator 22 does not slide into the hollow portion 59 of the second member 62. The front and rear actuators 14, 18 anchor the robot 10 to a conduit or pipe 70 (FIG. 6) and the middle actuator 22 displaces the robot along the pipe 70. In the illustrated embodiment, the middle actuator 22 may include multiple actuators or actuator sections 22a-22d stacked in a parallel, accordion-like formation. Each actuator 22a-22d is smaller than the first and second actuators 14, 18. The actuators 22a-22d also have a toroidal shape.

As shown in FIGS. 1 and 5a-5d, the illustrated substructure 26 includes a rigid material (e.g., ABS plastic). Utilizing a rigid substructure 26 allows the device 10 to fulfill various constraints that may be necessary for utility pipe inspection. For example, the substructure 26 provides alignment for all of the soft inflatable actuators 14, 18, 22. Having the actuators 14, 18, 22 aligned may be necessary for locomotion. In order for the device 10 to achieve locomotion, the anchoring actuators 14, 18 inflate in-line with the center axis of the pipe. A rigid spool design with recesses 54 that match the radius of the anchor actuators 14, 18 secures the anchoring actuators 14, 18 into place while pressurized. Additionally, the telescoping first and second members 58, 62 of the substructure 26 allow the length of the device to extend to 135% of its initial or retracted length, although other embodiments may include different values and ranges for the extension (e.g., 115%, 125%, 145%, 155%, between 115% and 155%, etc.). The elastic bands 66 that run the length of the device 10 provide tension on the first and second members 58, 62 at the fully extended length (e.g., 135% of the retracted length). The tensioning bands 66 bias the first and second members 58, 62 back toward the retracted position.

In the illustrated embodiment, the device 10 is extended by the four actuator sections 22a-22d, which expand the device 10 linearly. In one embodiment, the total retracted length of the device 10 is 15.6 cm and the extended length is 21.0 cm. The total weight of the device 10 is determined to be 195.5 g. The total force generated by this series of soft actuator sections 22a-22d is greater than the force provided by the tensioning bands 66 when inflated. This keeps the first and second members 58, 62 in the extended position. The tensioning bands 66 retract the first and second members 58, 62 back to the retracted length upon deflation of the actuator sections 22a-22d when there is no longer a force opposing the tensioning bands 66.

The actuators 14, 18, 22 may have different control states. For example, each of the actuators 14, 18, 22 may have inflating, deflating, holding inflated and holding deflated control states. In the inflating state, a fluid (e.g., air) is forced into one or more of the actuators 14, 18, 22 and an internal pressure of the actuator 14, 18, 22 increases. In the illustrated embodiment, the front and rear actuators 14, 18 inflate to a pressure between about 15 kPa and about 45 kPa, and the middle actuator inflates to a pressure of about 55 kPa, although other embodiments include different values and ranges. In the deflating state, the fluid is forced out of one or more of the actuators 14, 18, 22 and the internal pressure of the actuator 14, 18, 22 decreases. In the holding states, the internal pressure of the actuators 14, 18, 22 does not change (i.e., the actuator 14, 18, 22 remains either inflated or deflated).

Figure 8:
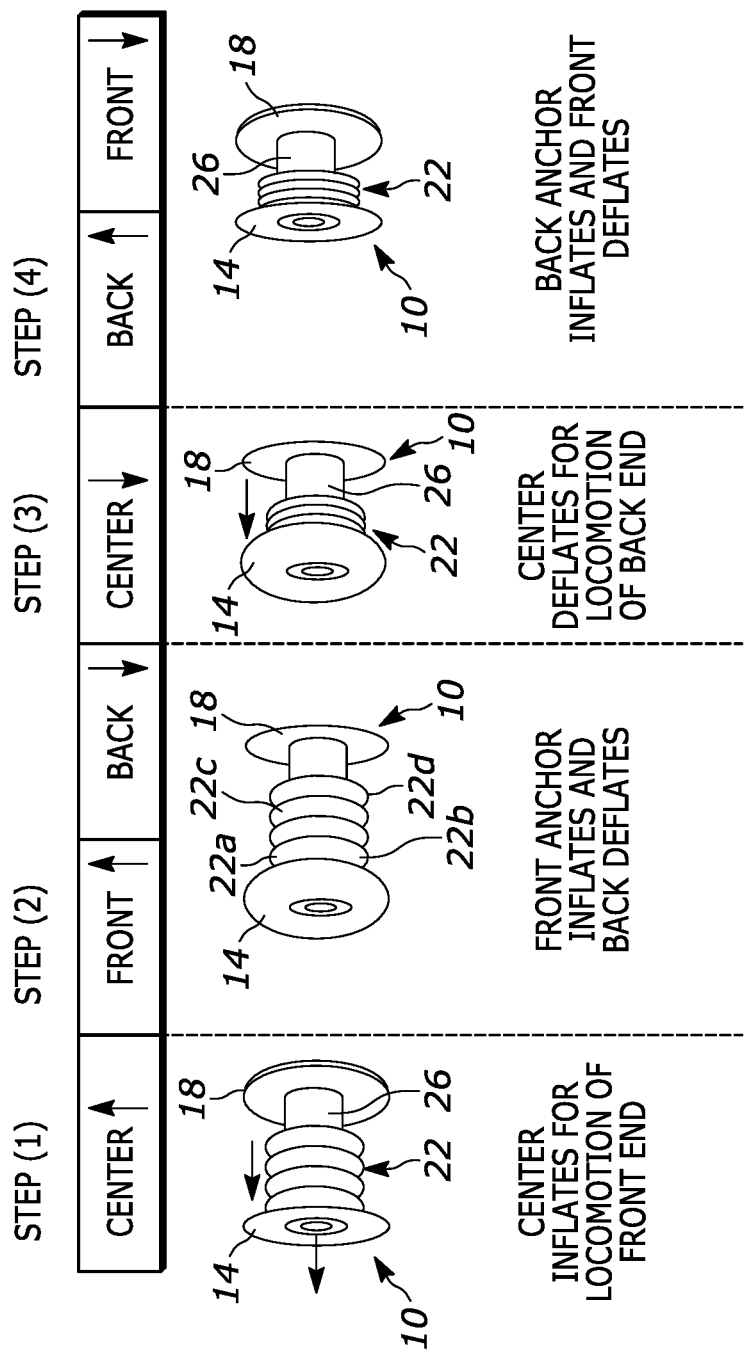
FIG. 8 is a table illustrating the positions of the robot during each state of the locomotion cycle of FIG. 7.

With reference to FIGS. 7 and 8, a locomotion cycle of the robot 10 may include distinct steps based on the different control states. For example, in a first step, the front and rear actuators 14, 18 are in a holding state. The front actuator 14 is holding in a deflated position and the rear actuator 18 is holding in an inflated position. The middle actuator 22 is in the inflating state. In some embodiments, as illustrated in FIG. 8, each of the actuator sections 22a-22d are in the inflated state. All of the actuator sections 22a-22d inflate and apply a force to the substructure 26 (FIG. 5a-5d). The inflated position of the rear actuator 18 anchors the rear actuator 18 to the pipe 70 (FIG. 5) and prevents the rear actuator 18, and the second member 62, from moving along the pipe 70. The deflated position of the front actuator 14 allows the front actuator 14, and the first member 58, to move along the pipe 70. The force applied by the middle actuators 22a-22d exceeds the biasing force of the tensioning bands 66 (FIG. 4b) and the first member 58 extends (e.g., telescopically forward) away from the second member 62.

In a second step, the front actuator 14 inflates so that the front actuator 14 and the first member 58 cannot move along the pipe 70. The rear actuator 18 deflates so that the rear actuator 18, and the second member 62, may move forward along the pipe 70. The middle actuators 22a-22d hold their inflated position so that the substructure 26 remains extended.

In a third step, the front actuator 14 remains inflated, the rear actuator 18 remains deflated, and the middle actuators 22a-22d are in the deflating state. In the deflating state, the biasing force of the tensioning bands 66 exceeds the force applied by the middle actuators 22a-22d and draws the members 58, 62 together. Since the front actuator 14 is holding the inflated position and the rear actuator 18 is holding the deflated position, the second member 62 slides forward toward the first member 52.

Figure 6:
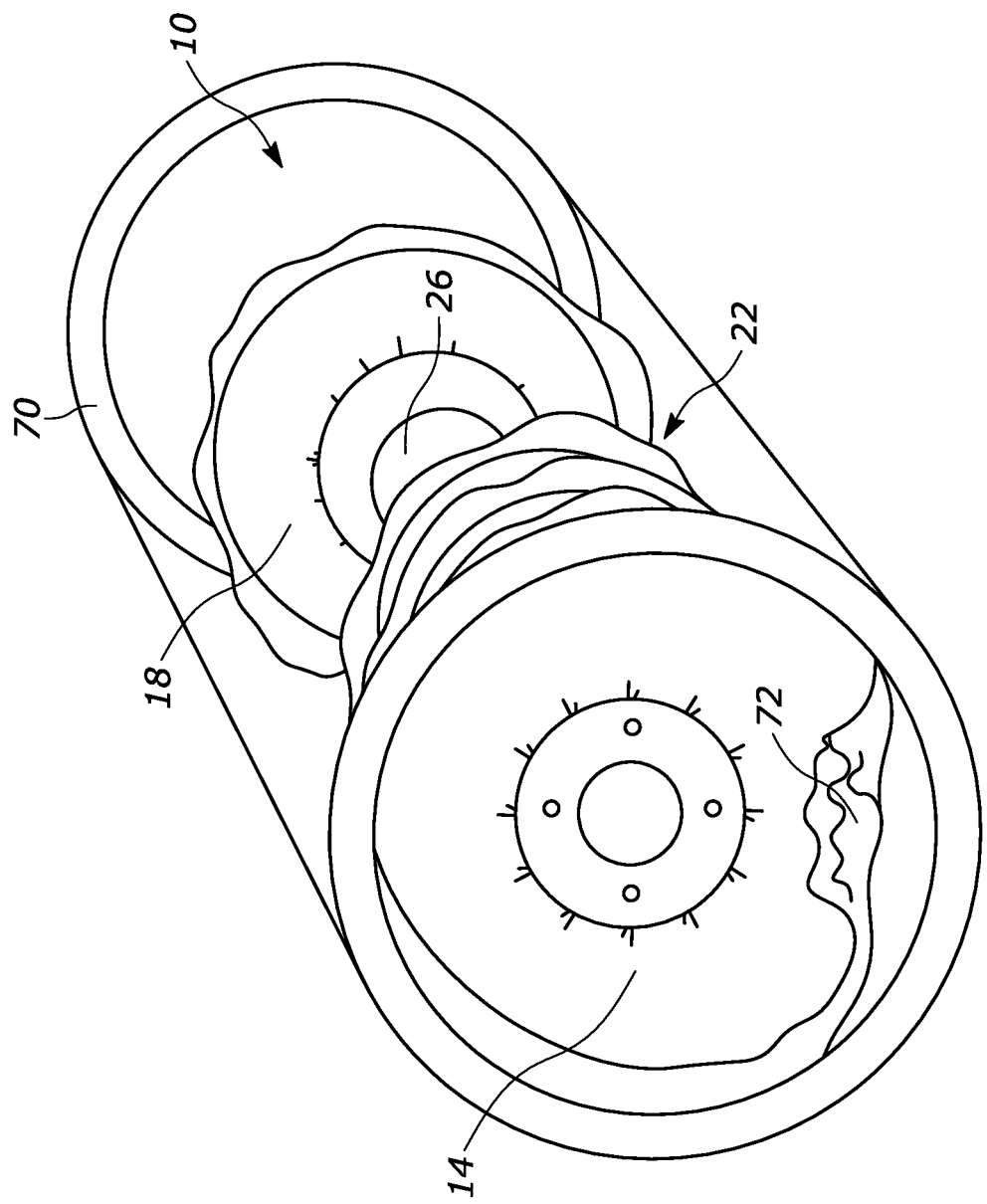
FIG. 6 is a perspective view of the robot of FIG. 1 traversing a pipe.

In a fourth step, the front actuator 14 deflates and the middle actuators 22a-22d hold the deflated position. The rear actuator 18 inflates so that the locomotion cycle can repeat. Between the first and fourth steps, the robot 10 has moved a percentage (e.g., about 35%) of the length of the substructure 26 in the retracted position (FIG. 5a). The movement of the robot 10 can clear foreign object debris (FOD) 72 from a pipe 70 (FIG. 6). In the illustrated embodiment, the robot 10 may move for example between 5 mm and 6 mm each cycle, although other embodiments include different values and ranges. The steps may also be performed in reverse so that the robot 10 moves in an opposite direction (i.e., the rear actuator 18 is the forward most actuator). The number of middle actuators 22a-22d may also be changed in order to change the force applied to the substructure 26, and therefore the distance that the robot 10 travels per cycle (i.e., more middle actuators 22a-22d increases the distance that the robot 10 travels per cycle).

Figure 9:
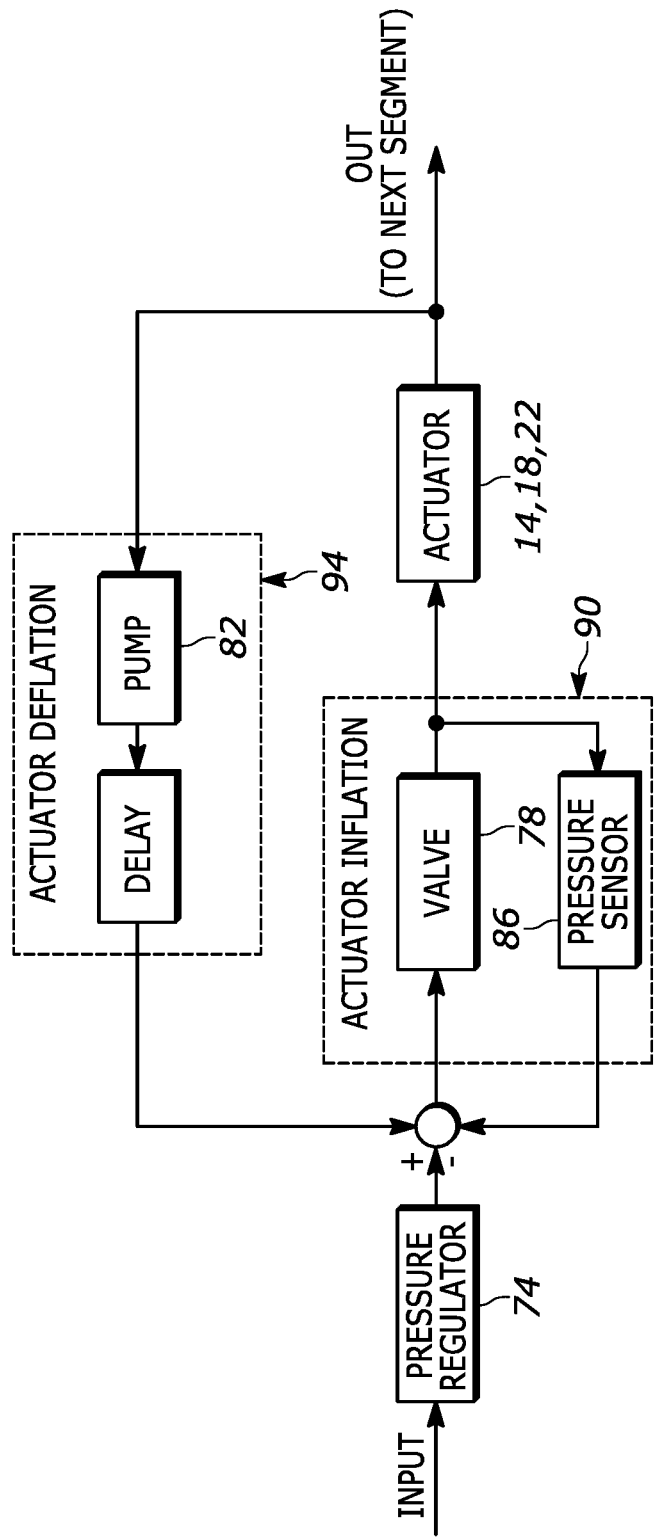
FIG. 9 is a block diagram illustrating a control algorithm for the locomotion cycle of FIG. 7.

With reference to FIG. 9, pressure regulators 74 and solenoid valves 78 connected in series may be utilized to regulate the supplied air pressure to the actuators 14, 18, 22. In some embodiments, the robot 10 may include three pressure regulators 74 and three sets of two solenoid valves 78. A constant flow vacuum pump 82 may be connected to exhaust ports of each valve set to expedite the deflation rate of the actuators 14, 18, 22. Pressure sensors 86 may be used to monitor the pressure of the actuators 14, 18, 22. In some embodiments, three pressure sensors 86 are connected in series with pneumatic supply lines. In some embodiments, the front and rear actuators 14, 18 are each attached to separate pneumatic supply lines 46 (FIG. 4a-4b), while all four of the middle actuators 22a-22d are connected in series to a single pneumatic supply line 46.

A supply pressure for each actuator 14, 18, 22 may be determined based on a desired anchoring force. A control algorithm, for example, accepts inputs from the pressure sensor 86 and a system timer (not shown) to control the air supply to the robot 10 via the regulators 74 and the valves 78. The desired actuator pressure for each actuator 14, 18, 22 can be set during an initialization phase of the algorithm. During operation of the robot 10, the supply pressure may be set to a greater value than the desired pressure to account for the observed dynamically non-linear inflation behavior of the actuators 14, 18, 22 during a transition from a deflated to an inflated state. The valves 78 switch to the hold state once the desired internal actuator pressure is reached.

A combination of a closed-loop inflation scheme 90 (e.g., feedback system) and an open-loop deflation scheme 94 in the control algorithm provides an efficient locomotion cycle time for the pipe inspection robot 10. The closed-loop feedback system 90 is implemented utilizing the in-line pressure sensors 86 to ensure that the internal actuator pressures match the set pressures. The open-loop deflation of the actuators 14, 18, 22 is based on a timing loop that sets the valves 78 to a deflate state for a specific amount of time in order to exhaust a constant volume of air at each cycle. In the illustrated embodiment, a 0.28 m$^3$/min vacuum is used to expedite the exhaust rate. A closed-loop control scheme may not be feasible for the deflation scheme 94 because the pressure drop inside a soft inflatable actuator 14, 18, 22 does not correspond to a volume deflation. The actuators 14, 18, 22 may retain a significant volume of air in the deflated state, leaving the robot 10 anchored to the pipe 70 even though the pressure has decreased significantly.

The robot 10 may move at about 2.2 mm/sec, although other embodiments include different rates. While moving, the robot 10 may experience a back and forth rocking motion as a result of a low coefficient of friction between the pipe 70 and the actuators 14, 18. The anchoring force (i.e., the internal pressure of the front and rear actuators 14, 18) may be increased to reduce the rocking. The actuators 14, 18 may also be made from a rougher material to increase the coefficient of friction.

The embodiments described above and illustrated in the figures are presented by way of example only and are not intended as a limitation upon the concepts and principles of the present disclosure. As such, it will be appreciated that variations and modifications to the elements and their configuration and/or arrangement exist within the spirit and scope of one or more independent aspects as described.

What is claimed is:

1. A device for traversing a conduit, the device comprising:
   a body having a first member receivable within a second member, the first member slidable relative to the second member;
   a first inflatable actuator coupled to a first end of the body and extending circumferentially around the first end of the body;
   a second inflatable actuator coupled to a second end of the body and extending circumferentially around the second end of the body, the second end located opposite the first end along an axial direction;
   a third inflatable actuator coupled to the body between the first actuator and the second actuator along the axial direction, wherein the third inflatable actuator extends circumferentially around the body; and a pneumatic system configured to change pressures within the first, second, and third actuators.

2. The device of claim 1, wherein the body includes a tensioning band configured to bias the first member axially to a retracted position within the second member.

3. The device of claim 1, wherein the first actuator has a toroidal shape.

4. The device of claim 1, wherein the third actuator includes multiple actuators stacked in parallel.

5. The device of claim 4, wherein the third actuator includes four actuators stacked in parallel.

6. The device of claim 1, wherein the first member and the second member are configured to move relative to one another when the pressure of the third actuator changes.

7. The device of claim 1, wherein at least one of the first actuator and the second actuator is configured to anchor to the conduit depending on a state of the device.

8. The device of claim 1, wherein the first member and the second member each include a groove, wherein the first actuator is coupled to the groove on the first member and the second actuator is coupled to the groove on the second member.

9. The device of claim 1, wherein an end of the second member includes a flange proximate an opening configured to receive the first member, and wherein an end of the first member includes a flange that is wider than the opening, wherein the third actuator is coupled to the first member between the flange of the first member and the flange of the second member.

10. The device of claim 1, wherein the pneumatic system uses a closed-loop feedback system to regulate pressures in the first, second, and third actuators.

11. A device for traversing a conduit, the device comprising:
    a body having a first member receivable within a second member, the first member slidable relative to the second member along an axial direction;
    a tensioning band coupled to both the first and second members and configured to bias the first member axially into a retracted position within the second member;
    first and second inflatable actuators coupled to an exterior of the first member; and
    a third inflatable actuator coupled to an exterior of the second member.

12. The device of claim 11, further comprising a pneumatic system configured to change pressures with the first, second, and third actuators.

13. The device of claim 12, wherein the pneumatic system uses a closed-loop feedback system to regulate the pressures in the actuators.

14. The device of claim 11, wherein the second actuator includes multiple actuators stacked in parallel.

15. The device of claim 11, wherein the first actuator has a toroidal shape.

16. The device of claim 11, wherein the first member and the second member each include a groove, wherein the first actuator is coupled to the groove of the first member and the third actuator is coupled to the groove of the second member.

17. The device of claim 11, wherein an end of the second member includes a flange proximate an opening configured to receive the first member, and wherein an end of the first member includes a flange that is wider than the opening, wherein the second actuator is coupled to the first member between the flange of the first member and the flange of the second member.

18. The device of claim 11, wherein the first member and the second member are configured to move relative to one another when the pressure of the third actuator changes.

19. The device of claim 11, wherein at least one of the first actuator and the second actuator is configured to anchor to the conduit depending on a state of the device.

20. A method for moving a device through a conduit, the device including a body having a first member that is slidably received in a second member, the device including a first inflatable actuator coupled to the body, a second inflatable actuator coupled to the body, and a third inflatable actuator coupled to the body, and a tensioning band configured to bias the first member into the second member, the method comprising:
    a first step of inflating the second and third actuators and deflating the first actuator;
    a second step of deflating the third actuator and inflating the first actuator while the second actuator remains inflated;
    a third step of deflating the second actuator while the first actuator remains inflated and the third actuator remains deflated; and
    a fourth step of inflating the third actuator and deflating the first actuator while the second actuator remains deflated;
    wherein at least one of the first step, the second step, the third step, and the fourth step includes retracting the first member into the second member with the tensioning band.

* * * * *